(12) United States Patent
Cabrera

(10) Patent No.: US 7,477,700 B2
(45) Date of Patent: Jan. 13, 2009

(54) TRANSMITTING RF SIGNALS EMPLOYING IMPROVED HIGH-LEVEL COMBINATIONS OF ANALOG FM AND DIGITAL SIGNALS

(75) Inventor: George Cabrera, Mason, OH (US)

(73) Assignee: Harris Corporation, Melbourne, FL (US)

( * ) Notice: Subject to any disclaimer, the term of this patent is extended or adjusted under 35 U.S.C. 154(b) by 652 days.

(21) Appl. No.: 10/788,710

(22) Filed: Feb. 27, 2004

(65) Prior Publication Data

US 2005/0190851 A1    Sep. 1, 2005

(51) Int. Cl.
H04L 27/00 (2006.01)

(52) U.S. Cl. ......................................... 375/295; 455/42

(58) Field of Classification Search ......... 375/259–260, 375/272, 269, 302, 295; 455/118–119, 102, 455/142, 42, 131, 313, 323
See application file for complete search history.

(56) References Cited

U.S. PATENT DOCUMENTS

| | | | | |
|---|---|---|---|---|
| 4,507,746 A * | 3/1985 | Fletcher, Jr. | ................. | 708/250 |
| 4,660,192 A * | 4/1987 | Pomatto, Sr. | ................. | 370/204 |
| 5,029,003 A * | 7/1991 | Jonnalagadda | .............. | 348/493 |
| 5,315,583 A | 5/1994 | Murphy et al. | | |
| 5,436,930 A * | 7/1995 | Bremer et al. | ............... | 375/295 |
| 5,465,396 A * | 11/1995 | Hunsinger et al. | ............ | 455/61 |
| 5,757,854 A * | 5/1998 | Hunsinger et al. | ........... | 375/260 |
| 5,838,799 A * | 11/1998 | Cioffi et al. | .................... | 381/2 |
| 5,859,876 A * | 1/1999 | Dapper et al. | ............... | 375/295 |
| 5,949,793 A * | 9/1999 | Bossard et al. | .............. | 370/487 |
| 5,991,334 A * | 11/1999 | Papadopoulos et al. | ..... | 375/216 |
| 6,014,407 A * | 1/2000 | Hunsinger et al. | .......... | 375/140 |
| 6,144,705 A | 11/2000 | Papadopoulos et al. | | |
| 6,166,774 A * | 12/2000 | Plonka | ....................... | 348/487 |
| 6,487,256 B2 * | 11/2002 | Kroeger et al. | .............. | 375/265 |
| 6,563,880 B1 * | 5/2003 | Hunsinger et al. | .......... | 375/260 |
| 6,721,337 B1 * | 4/2004 | Kroeger et al. | .............. | 370/477 |
| 6,898,249 B2 * | 5/2005 | Kroeger et al. | .............. | 375/259 |
| 6,914,579 B2 * | 7/2005 | Schadler | ..................... | 343/890 |
| 6,982,948 B2 * | 1/2006 | Kroeger et al. | .............. | 370/208 |
| 7,088,740 B1 * | 8/2006 | Schmidt | ...................... | 370/490 |
| 7,170,950 B2 * | 1/2007 | Wildhagen et al. | .......... | 375/295 |
| 2004/0048586 A1 * | 3/2004 | Monson | ....................... | 455/119 |

OTHER PUBLICATIONS

See Fig. 1 as the prior art and the description of Fig. 1 as presented herein.

* cited by examiner

Primary Examiner—Jean B Corrielus
(74) Attorney, Agent, or Firm—Tarolli, Sundheim, Covell & Tummino LLP

(57) ABSTRACT

Apparatus and method are presented for broadcasting an RF signal comprised of analog FM and digital signals. An analog FM source provides an analog FM signal. A digital source provides a digital signal. A splitter splits the FM signal into a fractional portion and remainder portion. A summer combines the fractional portion with the digital signal to provide a first combined signal. A main FM transmitter amplifies the remainder portion to provide an amplified FM signal. A digital transmitter amplifies the first combined signal to provide an amplified combined signal. A combiner combines the amplified FM signal and the amplified combined signal to provide a composite RF signal to be broadcasted.

12 Claims, 3 Drawing Sheets

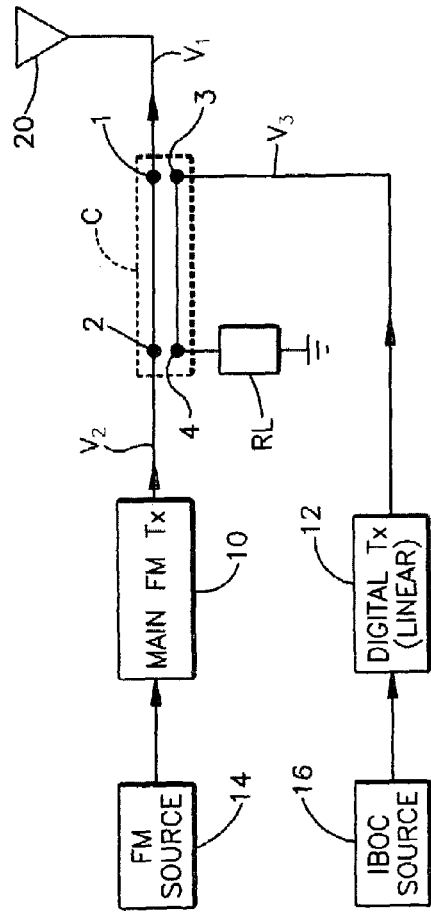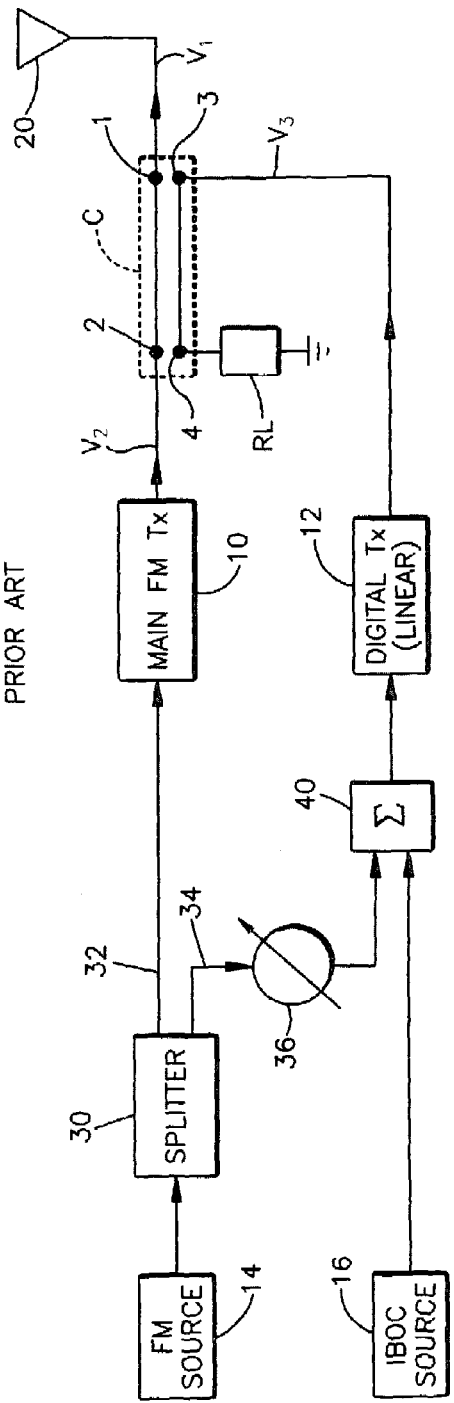

TRANSMITTING RF SIGNALS EMPLOYING IMPROVED HIGH-LEVEL COMBINATIONS OF ANALOG FM AND DIGITAL SIGNALS

BACKGROUND OF THE INVENTION

1. Technical Field

The present invention relates to broadcasting RF signals and, more particularly, to improvements in high level combining of analog FM and digital signals.

2. Description of the Prior Art

It has been known in the radio broadcasting art to transmit a composite signal consisting of a frequency modulated (FM) analog signal and a digital signal, such as an in band on channel (IBOC) digital signal. The prior art includes, for example, the U.S. patents to Murphy et al. U.S. Pat. No. 5,315,583 and Papadopoulos et al. U.S. Pat. No. 6,144,705.

The prior art also includes separate amplification of such signals, sometimes referred to as IBOC high-level combining. An example is illustrated in FIG. 1 herein. In this example, the output $v_2$ of an existing FM transmitter 10, illustrated as a main FM transmitter, is combined with the output $v_3$ from a digital transmitter referred to as a digital TX (linear) transmitter. The input to the main transmitter 10 is obtained from a conventional FM signal source 14 while the input to the digital transmitter 12 is obtained from a conventional IBOC source 16. The outputs $v_2$ and $v_3$ of these transmitters are combined in a conventional coupler C, which typically is a 10 dB coupler. The coupler, which is sometimes known as an output coupler, provides an output $v_1$, that is supplied to a transmitting antenna 20 for broadcasting the composite signal. The coupler C has ports 1, 2, 3 and 4 with the voltages $v_2$ and $v_3$ being applied to ports 2 and 3. The output at port 1 is supplied to the antenna 20. Port 4 is coupled to a reject load RL.

Because the outputs $v_1$ and $v_2$ are combined only after they have reached a high level of amplitude (because they have already been amplified by separate amplifiers) this is referred to in the art as "high-level combining" or "separate amplification". This type of combining results in high losses. This may be viewed as the penalty paid for the simplicity involved. In a 10 dB coupler, the problems that are noted include the following: the main FM transmitter needs to have enough headroom in order to increase its output power by 11% to overcome the combiner insertion loss. This can be very problematic in specific installations without additional headroom to spare. Major hardware upgrade could be necessary to overcome this issue, such as by replacing the existing main FM transmitter with a more powerful transmitter. A second problem with this type of system is that the overall dissipation increases. Besides the power dissipated by digital transmitter 12, additional energy is wasted at this reject load RL where up to 10% of the main transmitter FM output and up to 90% of the output of the digital transmitter will be dissipated. This inefficiency creates additional heat load for the air-conditioning equipment in the room containing the transmitter equipment.

The present invention is directed toward improvements in the combining of an output of an FM transmitter with that of a digital transmitter. The improvements are directed toward minimizing the FM and digital power losses in high level combining. The improved system provides various benefits including higher overall system efficiency and elimination of requirements for FM headroom.

SUMMARY OF THE INVENTION

In accordance with one aspect of the present invention, an apparatus is provided for broadcasting an RF signal comprised of analog FM and digital signals. The apparatus includes a splitter that splits an FM signal received from an analog FM source into a fractional portion and a remainder portion. The summer combines the fractional portion with a digital signal obtained from a digital source to provide a first combined signal. The main FM transmitter amplifies the remainder portion to provide an amplified FM signal and a digital transmitter amplifies the first combined signal to provide an amplified combined signal. A combiner then combines the amplified FM signal with the amplified combined signal to provide a composite RF signal to be broadcast.

In accordance with another aspect of the present invention, a method is provided for broadcasting an RF signal that is comprised of analog FM and digital signals. The method includes the steps of extracting a fractional portion of an FM signal provided by an analog FM source and providing a remainder portion. The summer combines the fractional portion with a digital signal obtained from a digital source to provide a first combined signal. The remainder portion and the first combined signal are respectively amplified by a main FM transmitter and a digital transmitter. The amplified FM signal and the amplified combined signal are then combined to provide a composite RF signal to be broadcast.

BRIEF DESCRIPTION OF THE DRAWINGS

The foregoing and other features of the present invention will become apparent to one skilled in the art for which the present invention relates upon consideration of the following description of the invention with reference to the accompanying drawings, wherein:

FIG. 1 illustrates a block diagram illustration of a prior art combining circuit;

FIG. 2 is a schematic-block diagram illustration of one embodiment of the present invention;

DESCRIPTION OF PREFERRED EMBODIMENTS

Figure 3:
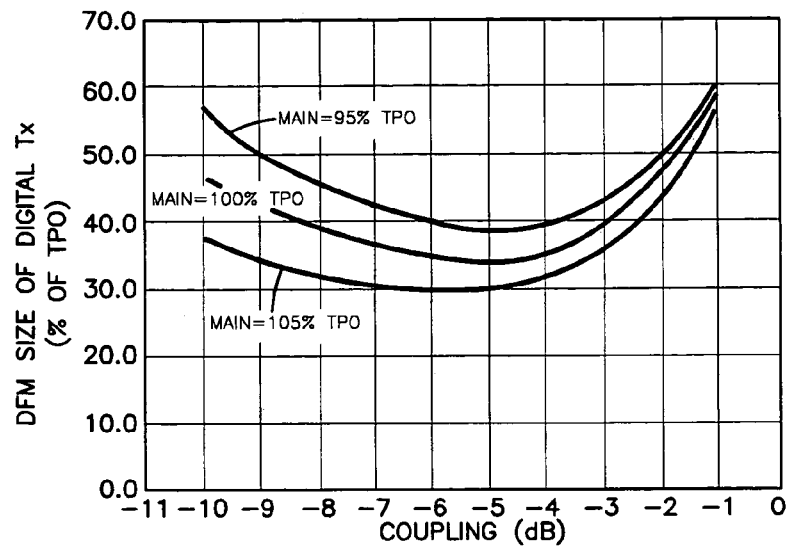
FIG. 3 is a graphical illustration that is helpful in understanding the invention.

Reference is now made to FIG. 2. This illustrates an embodiment of the invention which is similar in structure to that of the prior art as illustrated in FIG. 1. To simplify the description herein, like components in FIGS. 1 and 2 are identified with like character references with only the differences in the embodiment of FIG. 2 being described in detail below.

In the embodiment of FIG. 2, a splitter 30 is employed to split off a fractional portion 34 of the analog FM signal from the source 14 with the remainder portion 32 being supplied to the main transmitter 10. The fractional portion 34, which may be on the order of 1-10% of that obtained from source 14, is supplied by way of an adjustable phase adjuster 36 to a summer 40, the opposite of splitter 30. The phase adjusted fractional portion 34 from source 14 and digital IBOC signal obtained from source 16 are combined by summer 40 and the combined signal, as a first combined signal, is supplied to the digital transmitter 12. The fractional portion of the FM signal has been phase adjusted so that it will properly match that generated by the FM transmitter 10 when combined at the output combiner C. The outputs $v_2$ and $v_3$ are supplied to the coupler C and are combined to provide a combined or composite output $v_1$ for application to the broadcasting antenna 20.

It has been determined that the new and improved embodiment in FIG. 2 which may be considered as a dual FM (DFM) version, reduces the RF losses compared to that of the system in FIG. 1, making better use of the auxiliary transmitter 12. There is also a reduction of the FM odd mode excitation that is achieved by feeding the in-phase power into the coupler. A lower FM odd mode excitation brings about various benefits including a lower overall FM insertion loss, and a tighter coupler coefficient on the order of 6 dB or lower. The tighter coupling coefficient reduces the overall IBOC power generation and this reduces the overall IBOC power loss, enabling the injection of the FM signal through the auxiliary digital transmitter 12.

FIG. 2 presents a dual FM injection system in that it provides high-level combination of the FM and digital signals. Thus, the digital transmitter 12 carries the IBOC signal and a fractional portion of the FM signal that has been phased so as to match and add at the output combiner C with the signal generated by the FM transmitter 10.

This system as shown in FIG. 2 provides a solution of upgrading to IBOC without impacting the output requirement of the main FM transmitter. This reduces by at least 50% the power lost in the reject load. These features, along with the increase in overall system efficiency is described in greater detail in the analysis that follows below.

Combining Analysis

The combining analysis hereinafter involves significant equations and their explanation with respect to various graphical terms. It is believed that various definitions of terms and language employed should be defined to facilitate an understanding herein. Table 1, presented below, provides these definitions.

TABLE 1

| Definitions |
|---|
| IBOC = In-Band-On-Channel, a system of digital audio broadcast that places digital information on frequencies immediately adjacent to the analog AM or FM signal, but still within the assigned channel. |
| $v_1$ t) = Instantaneous voltage at port 1, as a function of time |
| $v_2$ (t) = Instantaneous voltage at port 2, as a function of time |
| $v_3$ (t) = Instantaneous voltage at port 3, as a function of time |
| rms = root mean square |
| $v_1$ = rms voltage at port 1 (rms) |
| $v_2$ = rms voltage at port 2 (rms) |
| $v_3$ = rms voltage at port 3 (rms) |
| t = time |
| T = period of integration |
| $S_{12}$ = scattering parameter, between port 1 and 2 |
| $S_{13}$ = scattering parameter, between port 1 and 3 |
| $P_1$ = power at port 1 |

TABLE 1-continued

| Definitions |
|---|
| $P_2$ = power at port 2 |
| $P_3$ = power at port 3 |
| $Z_0$ = system impedance, usually 50 Ohm |
| TPO = Transmitter Power Output, the licensed power a broadcast is allowed to transmit |
| Kv = Voltage peak-to-average ratio, in linear terms |
| IBOC/FM ratio = ratio between the IBOC and the FM signals |
| Tx = Transmitter |
| dB = a logarithmic ratio between two signals |
| dBc = a logarithmic ratio between a signal and a carrier |
| $v_{3\_iboc\_peak}$ = peak amplitude of the IBOC voltage at port 3 |
| $v_{3\_fm}$ = FM voltage at port 3 |
| $v_{3\_peak}$ = peak voltage at port 3 |
| $P_{3\_peak}$ = peak power at port 3 |
| CW = Constant wave. A signal whose amplitude does not change over time. The FM signal is an example of a CW signal, as its amplitude is unchanged (the information is conveyed in the frequency modulation, not on the amplitude..) |

$P_{reject}$=Total power dissipated in the reject load
$P_{reject\_fm}$=FM power dissipated in the reject load
Separate amplification=Prior art, where the FM transmitter is combined with the output of an IBOC-only transmitter
$\eta_{sys}$=overall system efficiency
$\eta_2$=efficiency of transmitter connected at port 2 (FM transmitter)
$\eta_3$=efficiency of transmitter connected at port 3 (Digital transmitter)

When two signals are combined, the instantaneous output voltage $v_1(t)$ is given by the sum of each coupled input voltage:

$$v_1(t)S_{12}v_2(t)+S_{13}v_3(t)$$

The average output power, $P_1$, is obtained by averaging, over time, the square of the resultant output voltage:

$$P_1 = \frac{1}{T}\int_o^T \frac{(S_{12}v_2(t)+S_{13}v_3(t))^2}{Z_o}dt$$

In the case of coherent signals, the numerator can be simplified as the square of the sum of their rms voltages:

$$P_1 = \frac{v_1^2}{Z_o} = \frac{(S_{12}v_2+S_{13}v_3)^2}{Z_o}$$

Where $v_1$, $v_2$, and $v_3$ are the corresponding rms values (vectors) for the waveforms $v_1$ (t), $v_2$ (t) and $v_3$ (t).

However, for incoherent signals, as those at different frequencies (FM and IBOC), the total power is obtained by the sum of each coupled power. This can be proven by solving the square of the resultant instantaneous voltage.

$$S_{12}^2 v_2(t)^2+2S_{12}S_{13}v_2(t)v_3(t)+S_{13}^2v_3(t)^2$$

Due to orthogonality between $v_2$ (t) and $v_3$ (t), their multiplication averages over time to zero, amounting to no contribution to the average power at the output. The resulting term, to be averaged over time, has been reduced to:

$$S_{12}^2v_2(t)^2+S_{13}^2v_3(t)^2$$

which means that the average power at the output, for non-coherent signals, is obtained by summing each coupled input power, $$P_1 = S_{12}^2 P_2 + S_{13}^2 P_3$$

Important to note that this value is smaller than the value obtained by the square of the sum of their rms voltages (properly phased), and accordingly, some power is being lost.

In the following sections, the advantages are noted of adding some coherence between the signals $v_2$ and $v_3$, such that the mid term does not totally cancel.

How Much Dual FM Injection is Needed

Partial coherence is obtained by adding some FM signal at port 3, along with IBOC. Let's now determine the minimum amount of dual FM injection that is needed so that the main FM power can remain unchanged.

Assume that $v_1$ is the output voltage, $v_2$ is the FM voltage applied at the thru port (where the main FM transmitter connects), and $v_{3\_fm}$ is the FM voltage applied at the coupled port of the output combiner (where the Digital transmitter connects).

To further simplify the analysis, make $Z_o=1$, and the total coupled FM power into port 1 (output)=1. Then at 100% TPO, $P_1=1$ and $v_1=1$:

$$P_1 = (S_{12}v_2 + S_{13}v_{3\_fm})^2 = 1$$

Solving for $v_3\_fm$, the FM voltage needed at the coupled port 3 to achieve output power $P_1=1$:

$$v_{3\_fm} = \frac{1 - S_{12}v_2}{S_{13}}$$

This expression is used for the condition of no impact on the main FM power. This condition forces $v_2=1$, and then the value $v_{3\_fm}$ obtained is the FM voltage needed at port 3 that guarantees that the main FM transmitter power is not affected. In other ways, viewed from the main transmitter's port (port 2), the combiner has no loss.

If we now sweep a range of coupling factors, then we obtain the dual FM injection level that is needed, as a function of the coupler used, in order to make the main FM path lossless.

TABLE 2

| Coupling (dB) | DFM injection level (% of TPO) |
|---|---|
| −10 | 2.6% |
| −9 | 3.4% |
| −8 | 4.3% |
| −7 | 5.6% |
| −6 | 7.2% |
| −5 | 9.5% |
| −4 | 12.6% |

Table 2, DFM level needed not to impact the main FM transmitter output.

How Much IBOC Injection is Needed

The peak IBOC voltage needed at the coupled port 3 ($v_{3\_iboc}$) to achieve the proper injection at the output is:

$$v_{3\_iboc\_peak} = \frac{0.1 k_v}{S_{13}}$$

where $k_v$ is the IBOC voltage peak-to-average ratio, in linear terms, needed to comply with the RF mask. A value of 1.778 (5 dB) will be considered throughout the analysis.

The ratio between the IBOC and FM through the digital transmitter is:

$$Iboc/\text{fm ratio} = 20 \log\left(\frac{0.1}{1 - S_{12}v_2}\right) dBc$$

Using the case in which the main Tx remains at 100% TPO ($v_2=1$), and considering a 6 dB coupler, the IBOC/FM ratio needed is −2.5 dBc.

So far it is seen that the required amount of dual FM injection at port 3 increases with the coupling factor, but in general it is a small fraction of the main FM service (or TPO).

On the other hand, the required generation of IBOC at port 3 is inversely proportional with the coupling coefficient. The smaller the coupling coefficient (the looser the coupling) the more IBOC power will need to be generated.

Considering both effects at once, tighter coupling coefficients require more DFM injection but less IBOC generation. The optimum coupling value that minimizes the size of the digital transmitter is now considered.

Optimum Coupling Coefficient for Minimum Size of Digital Transmitter

The peak voltage at port 3 is:

$$v_{3\_peak} = v_{3\_fm} + v_{3\_iboc\_peak}$$

which generates a peak power of:

$$P_{3\_peak} = \left(\frac{1 - S_{12}v_2}{S_{13}} + \frac{0.1 k_v}{S_{13}}\right)^2$$

This value includes fast, highly compressed envelope peaks. It is the short duration of these peaks, much shorter than the amplifier thermal constant (its temperature will hardly change with modulation) that allows the device to reach higher levels than in a CW mode. Accordingly, in order to compare the size of a digital transmitter, whose envelope is being pulsed, to the corresponding 100% TPO (that is provided by a CW-operated FM transmitter), we need to adjust these peak levels to its equivalent maximum CW operation.

Based on peak power measurements, we rate the maximum CW operation of a digital transmitter 0.5 dB below its maximum pulsed level. As an example, a 11.22 kW peak-capable digital transmitter will be considered to be a 10kW CW unit (10kW=11.22 kW−0.5 dB). This is the value that will be used to compare sizes between the FM and Digital transmitters.

The relative size of the digital transmitter, respect 100% TPO, can then be estimated by:

$$\text{Relative\_size} = \left(\frac{1 - S_{12}v_2}{S_{13}} + \frac{0.1 k_v}{S_{13}}\right)^2 10^{\frac{-0.5 db}{10}}$$

If we sweep a range of coupling coefficients, and graph three different values of $v_2$ (main FM output), we then obtain the results as seen in FIG. 3.

Several important conclusions can be extracted from FIG. 3. The optimum coupling coefficient (for size) is in the region of 5 to 6 dB, instead of the 10 dB coupling used in separate amplification.

The digital transmitter needs to be 35% the size of the main transmitter's (or TPO), in order to provide the secondary FM injection level that is required to make the main FM-path lossless. It is important to note that this value (35%) is comparable to the size demanded for separate amplification. In other words, with the same hardware (as the one used in prior art), we are now providing a "lossless" solution for the FM path, resolving the headroom problem.

FIG. 3 also shows that a bigger transmitter can afford to over-inject FM, resulting in gain at the main FM port. A smaller transmitter, with less injection than the one required (not to impact the main FM path), will make the main FM to have to overcome some loss.

Finally, by using now this tighter coupling coefficient (6 dB), the amount of IBOC that needs to be generated drops by 4 dB, of which 25% will get coupled to the output. As a result, the dissipated IBOC power into the reject load is about 30% of the amount dissipated in separate amplification. The next section studies the reject power in more detail.

Optimum Coupling Coefficient for Minimum Reject Power

The total reject power is composed of:

$$P_{reject} = P_{reject\_fm} P_{reject\_iboc}$$

where, $$P_{reject\_fm} = (S_{13}v_2 - S_{12}v_{3\_fm})^2$$

and, $$P_{reject\_iboc} = \left(\frac{0.1 S_{12}}{S_{13}}\right)^2$$

To keep our analysis practical, let's select the same size transmitter as the one required for separate amplification (minimum size).

With this restriction, the total FM voltage supplied at port 3 will be limited to:

$$v_{3\_fm} = 0.623 - \frac{0.1778}{S_{13}}$$

As the coupling coefficient is changed (or swept), and the digital transmitter size is now allowed to change, we will have to adjust the output of the main FM transmitter ($v_2$) in order to guarantee 100% TPO at the output of the combiner ($v_1=1)_5$.

The value of the voltage at port 2 then needs to be:

$$v_2 = \left(\frac{1 - S_{13}v_{3\_fm}}{S_{12}}\right)$$

Figure 4:
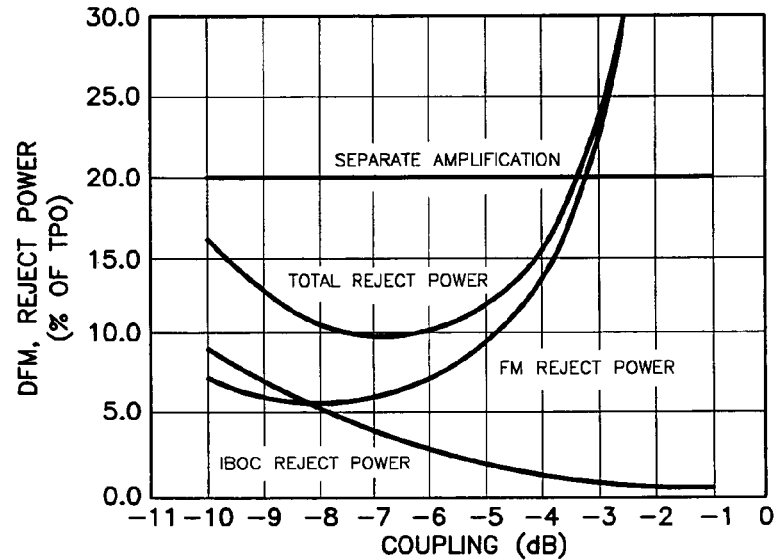
FIG. 4 is a graphical illustration that is helpful in understanding the invention.

FIG. 4 shows the total reject power for the DFM system, and its FM and IBOC contributions. As a comparison, the straight line represents the reject power for a 10 dB-coupler separate amplification system.

The minima in total reject power is found to be somewhere between 6 to 7 dB coupling, with a value equal to half of the power dissipated in separate amplification.

Output Power of a Digital Transmitter Operating with DFM

Considering signal clipping to be our limit (independent of their probability of occurrence), let's calculate the maximum average power at which a digital transmitter can be operated, for different IBOC injection levels.

$$P_3 = P_{3\_fm} + P_{3\_iboc}$$

Substituting, we obtain:

$$P_3 = v_{3\_fm}^2 + \left(\frac{1.06 - v_{3\_fm}}{k_v}\right)^2$$

Figure 5:
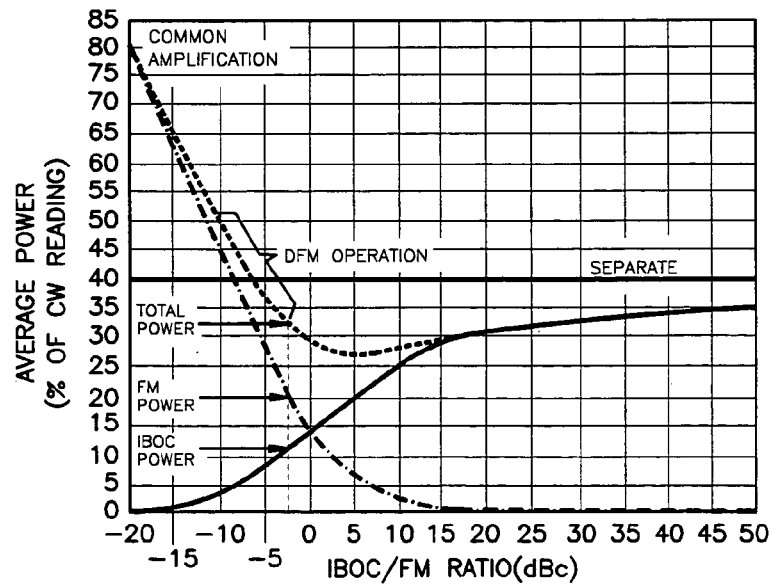
FIG. 5 is a graphic illustration that is helpful in understanding the invention.

The total output power of the digital transmitter, relative to its CW equivalent rating, has been plotted in FIG. 5 as a function of the IBOC/FM ratio.

The new operating average power, with a DFM injection of −2.5 dBc, is about the same than the IBOC-only rating.

We can already predict an improvement in the overall system efficiency, i.e., with the same generated average power of the digital transmitter (respect separate amplification), we have upgraded our system to FM IBOC without demanding 11% more power out of the main FM transmitter.

Efficiency of a Digital Transmitter Operating with DFM

Figure 6:
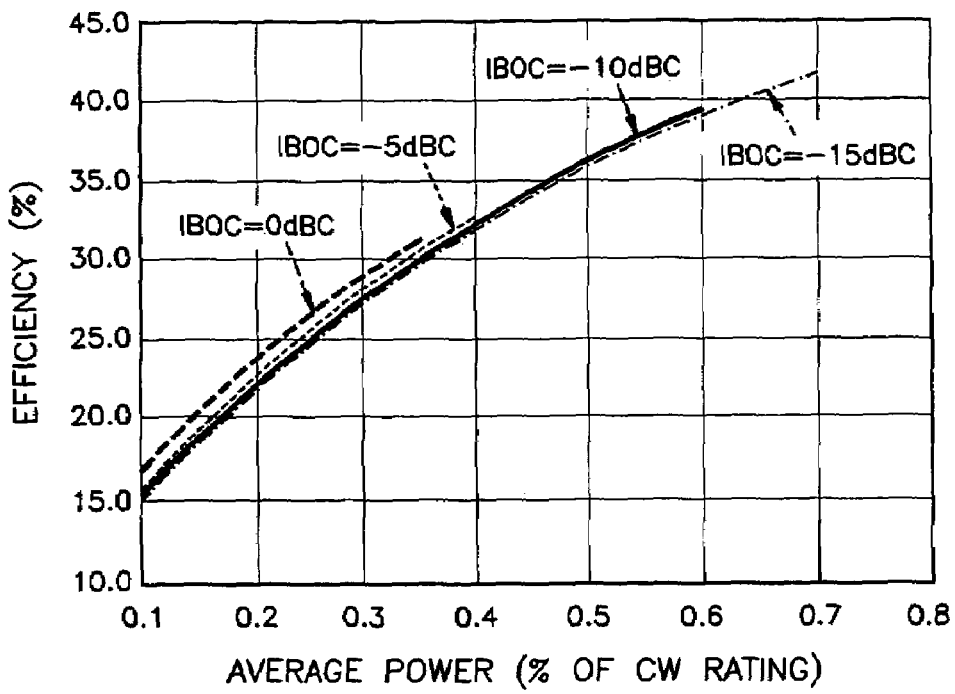
FIG. 6 is a graphical illustration that is helpful in understanding the invention.

The measured efficiency of a digital transmitter, operating at different levels of DFM injection is represented in FIG. 6.

For IBOC/FM ratios weaker than −10 dBc, the efficiency of a digital transmitter is very similar to the efficiency of common amplification. For stronger injection levels, the efficiency quickly improves (for the same average power) and approaches the efficiency of IBOC-only operation.

Overall System Efficiency

Knowing that the output power (including IBOC) has to be 1.01, the overall system efficiency is:

$$\eta_{sys} = \frac{1.01}{1.01 + P_2\left(\frac{1-\eta_2}{\eta_2}\right) + P_3\left(\frac{1-\eta_3}{\eta_3}\right) + P_{reject}}$$

We will assume a 60% efficiency for the FM transmitter $\eta_2$. The efficiency curve fit function used to generate the graph in FIG. 6 will be used to compute the value of $\eta_3$. Equations for the other terms have already been determined.

Figure 7:
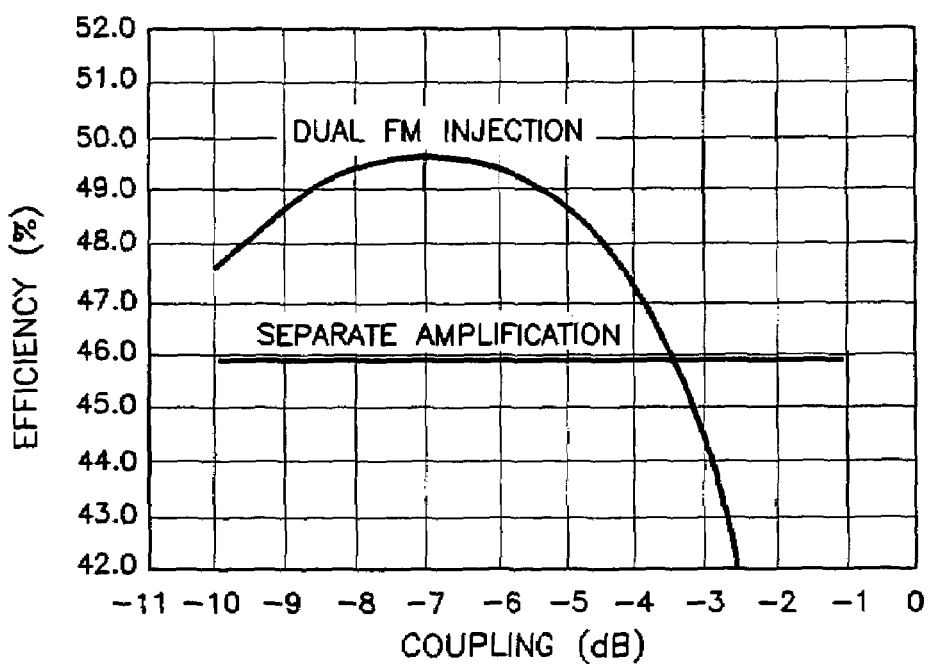
FIG. 7 is a graphical illustration that is helpful in understanding the invention.

A graph of the overall efficiency for a DFM system implemented using the minimum size digital transmitter, is represented in FIG. 7.

With the new DFM implementation, the efficiency approaches 50%, as compared to separate amplification, whose efficiency would be 46%. The coupling coefficient for peak efficiency is found at 6.75 dB.

We have described the Dual FM injection, an improved high-level combining method of upgrading to IBOC. This method uses a tighter coupling coefficient at the output combiner, which decreases the IBOC losses. Simultaneously, by injecting a small fraction of the FM signal, properly phased, at the coupled port, the total combining efficiency is increased, as both the main and the dual FM injection are partially summed at the output.

A coupling factor of 6 dB is the optimum value to minimize the size required for the digital transmitter and to reduce the dissipation in the reject load, and as such boosting the overall system efficiency by 3 to 4%. Under these conditions, the total reject power is expected to be reduced by 50%.

All these benefits are added to the fact that with DFM injection, the main FM transmitter does not have to increase its output level to overcome the coupler losses, an inconvenience at times unsurpassable for many installations in the field.

Finally, the system performance is dependent on the size of the digital transmitter in the following manner; the bigger the digital transmitter to be used, the stronger the FM injection through it and the tighter the optimum coupling coefficient can be, this way obtaining a lower output power demanded of the main FM transmitter, a lower reject power and a higher overall system efficiency.

It has been determined that this system of high-level combining with dual FM injection achieves lower insertion loss for the FM transmitter. Instead of a 10% insertion loss known in the prior art, the typical insertion loss for the new system is 0 dB (no loss), if a 6 dB coupler is used. If tighter couplers are used, an actual gain is achieved, as more FM power is added through port 2. This improvement is fundamental to economically upgrade to IBOC in "difficult powers" where the FM insertion loss can not be tolerated if prior art is to be used. Overall efficiency of this new system can be as high as 52% using present broadcast technology, which results in a reduction of 20% in dissipated power. The RF combining efficiency can reach 98.5% with typical values of 95%. The equipment ratio to make the conversion is now 1.35. The small difference of 4% in size (minimum), in practice is enough to provide optimum configuration to broadcast customers.

Although the invention has been described in conjunction with a preferred embodiment, it is to be appreciated that various modifications may be made without departing from the spirit and scope of the invention as defined by the appended claims.

Having described the invention, I claim the following:

1. An apparatus for broadcasting an RF (radio frequency) signal comprised of analog FM (frequency modulation) and digital signals comprising:
   a splitter that receives said analog FM signal for splitting said FM signal into a fractional portion and a remainder portion;
   a summer for summing said fractional portion with said digital signal to provide a first combined signal;
   a main FM transmitter for amplifying said remainder portion to provide an amplified FM signal;
   a digital transmitter for amplifying said first combined signal to provide an amplified combined signal; and
   further comprising a combiner that combines said amplified FM signal and said amplified combined signal to provide said RF signal to be broadcasted, a phase adjuster located between said splitter and said summer for adjusting the phase of said fractional portion.

2. An apparatus as set forth in claim 1 wherein said phase adjuster is manually adjusted.

3. An apparatus as set forth in claim 1 wherein said combiner is a signal coupler having a coupling coefficient in the range from about −3 dB to about −9 dB.

4. An apparatus as set forth in claim 3 wherein said adjuster is manually adjusted.

5. An apparatus as set forth in claim 1 wherein said combiner is a signal coupler having a coupling coefficient on the order of around −5 dB.

6. An apparatus as set forth in claim 5 wherein said adjuster is manually adjusted.

7. An apparatus for broadcasting an RF (radio frequency) signal comprised of analog (FM frequency modulation) and digital signals comprising:
   a splitter that receives said analog FM signal for splitting said FM signal into a fractional portion and a remainder portion;
   a summer for summing said fractional portion with said digital signal to provide a first combined signal;
   a main FM transmitter for amplifying said remainder portion to provide an amplified FM signal;
   a digital transmitter for amplifying said first combined signal to provide an amplified combined signal; and
   said digital signal is an IBOC (inband on channel) digital signal, said apparatus further comprising a combiner that combines said amplified FM signal and said amplified combined signal to provide said RF signal to be broadcasted and including a phase adjuster located between said splitter and said summer for adjusting the phase of said fractional portion.

8. An apparatus as set forth in claim 7 wherein said adjuster is manually adjusted.

9. An apparatus as set forth in claim 7 wherein said combiner is a signal coupler having a coupler coefficient on the order of about −3 dB to about −9 dB.

10. An apparatus as set forth in claim 9 wherein said adjuster is manually adjusted.

11. An apparatus as set forth in claim 7 wherein said combiner is a signal coupler having a coupling coefficient on the order of about −5 dB.

12. An apparatus as set forth in claim 11 wherein said adjuster is manually adjusted.

* * * * *